United States Patent Office 2,958,674
Patented Nov. 1, 1960

2,958,674

POLYMETHYL METHACRYLATE-PARTIAL ALKYL ESTER OF POLYMETHACRYLIC ANHYDRIDE BLEND AND METHOD FOR PREPARING SAME

Lawrence F. Arnold, Avon Lake, Ohio, assignor to The B. F. Goodrich Company, New York, N. Y., a corporation of New York No Drawing. Filed Aug. 11, 1958, Ser. No. 754,170

4 Claims. (Cl. 260—45.5)

This invention relates to a new thermoplastic composition and more particularly pertains to a high softening, hard thermoplastic resin comprising from about 75 to about 95% polymethyl methacrylate and from about 5 to about 25% of a partial alkyl ester of polymethacrylic anhydride.

It is well known that polymethyl methacrylate, which is also known as "Lucite" and "Plexiglas," can be cast, molded, extruded and milled into structures having remarkable clarity and transparency. It is also known that a need exists for a material which is similar to polymethyl methacrylate in optical clarity with greater hardness and resistance to softening at elevated temperatures. Such a material would be a useful improvement over presently known thermoplastics in many applications such as scratch resistant optical lenses and scratch resistant shatterproof electric light fixtures, automobile taillights and the like. The limits of utility of presently known optical thermoplastic materials have been reached and the need for a higher softening, harder optical thermoplastic is apparent.

Accordingly, it is an object of this invention to provide a hard, optically clear thermoplastic composition. Another object of this invention is the provision of a high temperature softening optically clear thermoplastic composition. Still another object of this invention is the provision of a method for preparing a hard, high temperature softening, optically clear thermoplastic composition. These and other objects will become apparent from a consideration of the following description and examples.

I have discovered a composition comprising from 75 to 95 parts by weight of polymethyl methacrylate and from 5 to 25 parts by weight based on the weight of said polymethyl methacrylate of a polymer having ester and carboxyl groups on the main polymer chain, said ester and carboxyl groups being so interspersed that not more than one acyl group of each anhydride on a parent polyanhydride is esterified, said polymer having a plurality of

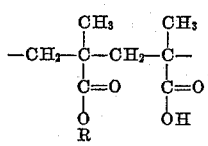

units corresponding to from 10 to 100% and more preferably 30 to 90% of the anhydride units present in the parent polyanhydride wherein R represents an alkyl group having from 1 to 4 carbon atoms.

The partial esters of polymethacrylic anhydride and methods for preparing them are claimed and more fully described in the copending U.S. patent application of John F. Jones, Harold Tucker and Lawrence F. Arnold, Serial No. 724,889, filed March 31, 1958. The polymeric anhydrides and their methods of preparation are described more fully and claimed in the copending application Serial No. 555,308, filed December 27, 1955, by John F. Jones.

The polymethacrylic anhydride useful for preparing the partial esters embodied in this invention is conveniently prepared by polymerizing methacrylic acid with a free radical catalyst in the presence of a dehydrating agent such as acetic anhydride in an inert organic diluent. The resulting polymer contains the recurring structure

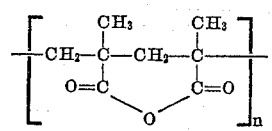

wherein $n$ is an integer greater than 1.

The partial esters of this invention can be prepared by reacting the polymeric anhydride with primary or secondary aliphatic alcohols. The reaction is preferably carried out in inert diluent such as a liquid hydrocarbon or halogenated hydrocarbon in which the alcohol is soluble, in the presence of a trace of an esterification catalyst, preferably, a tertiary amine such as pyridine, at a slightly elevated temperature of from about 50 to about 100° C. the reaction will proceed at room temperature but the rate is generally too slow for practical purposes.

Specific alcohols are methanol, ethanol, $n$ and secondary propanols, $n$ and secondary butanols and isobutanol.

It is possible to have ester, free carboxyl, and anhydride groups on the same polymer chain by reacting the anhydride polymer with less than stoichiometric quantities of primary or secondary alcohol to form a partially esterified polymer having from as low as about 0–5% to as much as about 80% of the anhydride groups unreacted.

The polymethyl methacrylates useful in this invention include the commercial plastic or resin grades commonly sold under the trade names of "Plexiglas" or "Lucite."

The polymethacrylic anhydride used in preparing the partial esters for Example I was made by adding 2% by weight based on the weight of methacrylic acid of benzoyl peroxide to a mixture of about 10% glacial acrylic acid and 90% benzene containing a mole of acetic anhydride per mole of methacrylic acid. Air was swept from the polymerization flask with a stream of nitrogen, the flask was sealed and the temperature was adjusted to 50° C. After about 16 hours the reaction was complete and the polymethacrylic anhydride formed as a white, grainy powder suspended in benzene. The polymer was filtered, washed with benzene and then dried in a vacuum oven at 50° C.

The partial methyl ester of polymethacrylic anhydride was prepared by suspending 154 g. of polymethacrylic anhydride in a mixture of 1,000 ml. of dry benzene, 64 g. of methanol and 2 drops of pyridine. The polymer slurry was then stirred at about 60° C. for about 16 hours. The partial methyl ester of polymethacrylic anhydride was isolated by suction filtration and was dried at 50° C. in a vacuum oven. The polymethyl methacrylate-partial alkyl ester of polymethacrylic anhydride compositions embodied in this invention are prepared in the preferred manner by milling the two polymeric components together at a temperature of from 385 to 405° F. and pressing the resulting sheets at a temperature of from 400 to 480° F.

The following example will illustrate further the product and process of this invention. The amounts of ingredients are given in parts by weight unless otherwise specified.

Example I

Blends of polymethyl methacrylate-partial methyl ester of polymethacrylic anhydride were made on a mill at from 342–411° F. and the resulting sheets were pressed at the indicated temperature. Polymethyl methacrylate itself was treated in the same manner to serve as a control.

| Polymethyl Methacrylate | Partial methyl ester of Polymethacrylic anhydride | Press Temp., ° F. | A.S.T.M. Heat Distortion, ° C. | Barcol Hardness |
|---|---|---|---|---|
| 100 | | 475 | 77 | 28 |
| 100 | | 400 | 76 | 33 |
| 95 | 5 | 400 | 78 | 34 |
| 90 | 10 | 400 | 84 | 38 |
| 84.8 | 15.2 | 400 | 84 | 43 |
| 75 | 25 | 475 | 88 | 39 |

The samples were milled for ten minutes and then pressed in a heated mold for ten minutes at 1,000 p.s.i.

The embodiments of the invention in which an exclusive property or privilege is claimed are defined as follows:

1. The composition comprising from 75 to 95 parts by weight of polymethyl methacrylate and from 5 to 25 parts by weight based on the weight of said polymethyl methacrylate of a polymer having ester and carboxyl groups on the main polymer chain, said ester and carboxyl groups being so interspersed that not more than one acyl group of each anhydride group on a parent anhydride homopolymer having the structure

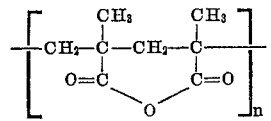

wherein $n$ is an integer greater than 1 is esterified, said polymer having

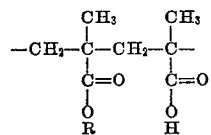

units corresponding to from 10 to 100% of the anhydride units present in the parent anhydride homopolymer wherein R represents an alkyl group having from 1 to 4 carbon atoms.

2. The composition comprising from 75 to 95 parts by weight of polymethyl methacrylate and from 5 to 25 parts by weight based on the weight of said polymethyl methacrylate of the monomethyl ester of from 10 to 100% of the anhydride units originally preesnt in polymethacrylic anhydride.

3. The composition of claim 2 wherein the monomethyl ester of polymethacrylic anhydride results from the esterification of from 30 to 90% of the anhydride groups originally present in the parent anhydride homopolymer with methanol.

4. The method for preparing the composition comprising from 75 to 95 parts by weight of polymethyl methacrylate and from 5 to 25 parts by weight based on the weight of said polymethyl methacrylate of a polymer having ester and carboxyl groups on the main polymer chain, said ester and carboxyl groups being so interspersed that not more than one acyl group of each anhydride group on a parent anhydride homopolymer having the structure

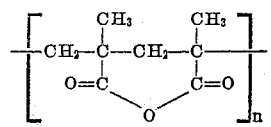

wherein $n$ is an integer greater than 1 is esterified, said polymer having

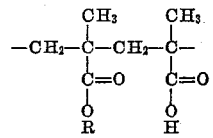

units corresponding to from 10 to 100% of the anhydride units present in the parent anhydride homopolymer wherein R represents an alkyl group having from 1 to 4 carbon atoms, said method comprising milling said polymethyl methacrylate and said polymer together at a temperature of from 385 to 405° F. and pressing the resulting sheets at a temperature of from 400 to 480° F.

References Cited in the file of this patent
UNITED STATES PATENTS

| | | |
|---|---|---|
| 2,308,581 | Barnes | Jan. 19, 1943 |
| 2,369,520 | Barnes | Feb. 13, 1945 |
| 2,402,604 | Coffman | June 25, 1946 |
| 2,539,376 | Staudinger | Jan. 23, 1951 |